May 1, 1945.   H. J. ANDREW   2,374,718
APPLIANCE FOR MACHINE TAPPING OR SCREWING OPERATIONS
Filed Aug. 25, 1942
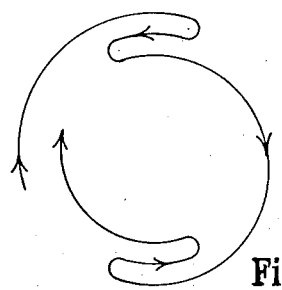
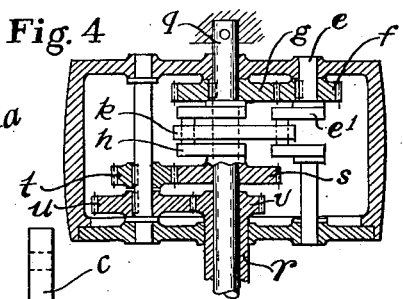
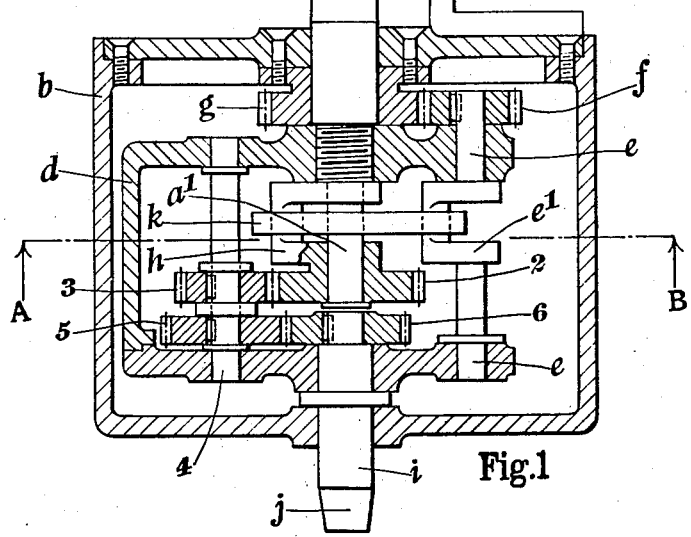
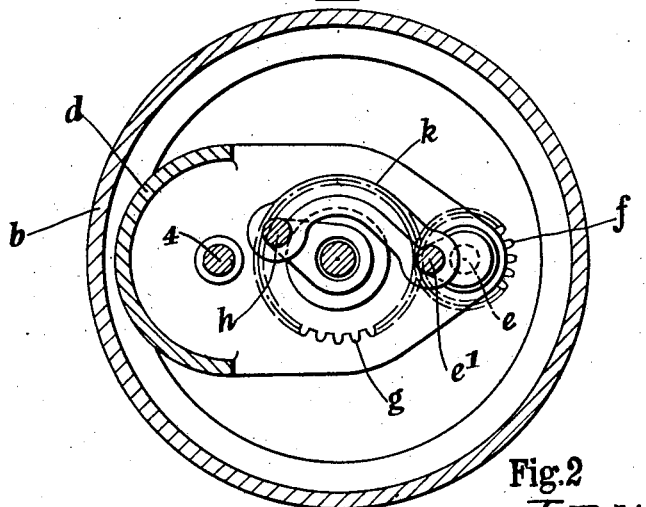
Inventor
H. J. Andrew Patented May 1, 1945

2,374,718

UNITED STATES PATENT OFFICE 2,374,718

APPLIANCE FOR MACHINE TAPPING OR SCREWING OPERATIONS

Harry Jones Andrew, Oldham, England

Application August 25, 1942, Serial No. 456,075
In Great Britain October 8, 1941

3 Claims. (Cl. 74—67)

This invention relates to appliances for the machine tapping or screwing of articles, such appliances being of the type in which the drive to the tapping tool incorporates means for periodically reversing the drive so as to break up the metal removed during the tapping operation and therefore obviate damage thereby of the threads being produced or breakage of taps.

The invention comprises the interposition in a drive to a tapping tool of two cranks, one of which (of less throw than the other) is revolved about its axis and imparts back and forth or oscillatory movements to the other, the crank shaft of the former crank revolving around the axis of the other crank shaft, whereby positive and negative accelerations are imparted to the tapping tool.

The invention further comprises incorporating the drive between the tapping machine spindle and the tool or in the drive to the machine spindle.

Referring to the two accompanying sheets of explanatory drawings:

Figure 1 is a sectional elevation and Figure 2 a sectional view on the line AB of Figure 1 illustrating a drive for a tapping appliance constructed and arranged in one convenient form in accordance with this invention.

Figure 3 is a diagram showing the angular movement of the tapping tool driven by the Figure 1 and 2 construction of drive.

Figure 4 is a sectional view illustrating a modified application of my invention.

In Figures 1 and 2, the taper shank $a$ is adapted to be inserted into the spindle of a tapping machine and the case $b$ is adapted to be held against rotation, by for example the bracket $c$ thereon being secured to the non-rotating quill of the tapping machine spindle. A frame $d$ is secured to the shank or shaft $a$ so that it revolves therewith and there is journalled therein a crank shaft $e$ which carries a gear wheel $f$ meshing with a gear wheel $g$ secured to the stationery case $b$. It will be seen therefore that the crank shaft is revolved about the axis of the shaft $a$ and is also revolved about its own axis by the gear wheels $f$ and $g$.

A crank $h$ of larger throw than the crank $e^1$ is formed on or secured to a gear wheel 2 which meshes with a planetary gear wheel 3 keyed to a spindle 4 which is journalled in the frame $d$. A further planetary gear wheel 5 keyed to the spindle 4 rotates the gear wheel 6 upon the spindle $i$ which is tapered at $j$ to receive the tap holding chuck. The crank $h$ is connected to the crank $e^1$ by the connecting rod $k$. An extension $a^1$ of reduced diameter of the shank $a$ is journalled in the crank $h$, and the connecting rod $k$ is curved to clear the extension $a^1$.

It will be seen that with the construction illustrated the shaft $a$ turns the spindle $i$ due to the frame $d$ carrying the crank shaft $e$ and the speed increasing gears 3 and 5 with it around the wheels 2 and 6 and that the actual rate of rotary movement of the spindle is subject to positive and negative accelerations or is accelerated and decelerated by the action of the crank $e^1$, connecting rod $k$ and crank $h$. Figure 3 represents diagrammatically the angular motion of the spindle $h$.

In the arrangement illustrated in Figure 4, which is similar to that shown in Figure 1, I interpose a speed increasing gearing between the crank $h$ and the hollow spindle $r$ upon which the pulley $p$ is to be secured. This gearing, comprising the wheels $s$, $t$, $u$ and $v$, ensures that the positive and negative accelerations are amplified.

The casing $b$ or the pulley $o$ may contain lubricant for the driving mechanism within.

What I claim is:

1. A transmission device for use in a drive to a tapping tool for forming screw threads, comprising a driving member, a driven member in axial alignment therewith, a coupling comprising a crank in alignment with the driving member, a second crank having a lesser throw than the first and a link connecting the cranks together, a shaft carrying the second crank and adapted to be revolved about the axis of the driving member by the latter, a stationary gear wheel coaxial with the driving member, a gear wheel fast on the crank shaft meshing with the stationary gear wheel for causing the crank shaft to rotate as it revolves about the axis of the driving member, and planetary speed-increasing gearing comprising two sun wheels and two planetary pinions, one sun wheel coupled with the first crank and the other with the driven member, for the purpose of causing automatically positive and negative accelerations of the driven member with reference to the driving member.

2. A transmission device for use in a drive to a tapping tool for forming screw threads, comprising a pulley, a driven member, a stationary gear wheel and a crank, all in axial alignment, a shaft rotatably mounted in the pulley, parallel to the axis thereof, a gear wheel fast on the shaft, meshing with the stationary gear wheel, for causing the shaft to rotate about its own axis as the pulley revolves, a crank formed in the shaft, with a smaller throw than the first crank, a link connecting the two cranks together, and planetary speed-increasing gearing comprising two sun wheels and two planetary pinions, one sun wheel coupled with the first crank and the other with the driven member, for the purpose of causing automatically positive and negative accelerations of the driven member with reference to the pulley.

3. Means for driving a tapping tool in a machine for forming screw threads, comprising a fixed casing, a sun wheel fixed to the casing, a tool holder journalled in the casing, a driving spindle journalled in the casing, a frame fixed to the spindle and enclosed in the casing, a shaft mounted in the frame, a planetary wheel keyed to the shaft and meshing with the sun wheel and thereby rotating the shaft, a crank freely mounted on the driving spindle, a second shaft, of smaller throw than the first, formed in the shaft, a link connecting the two cranks together, and planetary speed-increasing gearing comprising two sun wheels and two planetary pinions, one sun wheel running on the driven spindle and being secured to the first crank and the other being fast on the tool holder, the pinions being secured together and freely mounted on the shaft, for the purpose of causing automatically alternate positive and negative accelerations of the tool holder with reference to the driving spindle.

HARRY JONES ANDREW.